Sept. 22, 1970    C. P. SANDBANK ET AL    3,530,299
OPTICAL DEVICE FOR RESPONDING TO DIFFERENCE FREQUENCY
OF INCIDENT LIGHT BEAMS
Filed Aug. 19, 1966    4 Sheets-Sheet 1

(A)

(C) Sect. X-X (B)

(D) Sect Y-Y

*Inventors*
CARL P. SANDBANK
ROBERT J. STRAIN
By
*Attorney*

(F)        (I) Sect. W-W (G)        (J) Sect. V-V (H) Sect. Z-Z (K)

(N) Sect. T-T (L) Sect. R-R (P) Sect. Q-Q (M) Sect. S-S

Inventors
CARL P. SANDBANK
ROBERT J. STRAIN
By
Attorney

Sept. 22, 1970  C. P. SANDBANK ET AL  3,530,299
OPTICAL DEVICE FOR RESPONDING TO DIFFERENCE FREQUENCY
OF INCIDENT LIGHT BEAMS
Filed Aug. 19, 1966  4 Sheets-Sheet 4

Inventors
CARL P. SANDBANK
ROBERT J. STRAIN
By *Percy P. Lantz*
Attorney ated Sept. 22, 1970

3,530,299
OPTICAL DEVICE FOR RESPONDING TO DIFFERENCE FREQUENCY OF INCIDENT LIGHT BEAMS
Carl Peter Sandbank, Bishop's Stortford, England, and Robert Joseph Strain, Plainfield, N.J., assignors to International Standard Electric Corporation, New York, N.Y., a corporation of Delaware
Filed Aug. 19, 1966, Ser. No. 573,555
Claims priority, application Great Britain, Aug. 27, 1965, 36,915/65
Int. Cl. H01l 15/06
U.S. Cl. 250—211  15 Claims

ABSTRACT OF THE DISCLOSURE

A semiconductor optical mixer system having a thin epitaxial photosensitive mixing layer deposited on a substrate of opposite conductivity type. The mixing layer has an electric field and induced current established therein parallel to the surface of the mixing layer which is modulated upon exposure to two incident beams of light at their difference frequency. The mixing layer is covered with a transparent protective layer, such as silicon oxide, having a thickness which provides for optical impedance matching.

---

The invention relates to semiconductor planar optical mixer systems.

In semiconductors planar optical mixer systems the semiconductor planar optical mixers are used to detect the difference frequency of two light beams which are incident on the surface of the mixer and coplanar with the applied electric field. The electric field establishes within the semiconductive mixing layer of the planar optical mixer a drift charge of carriers. Due to the interference effects between the incident light beams the carriers within the mixing layer are modulated by the light beams at their difference frequency. The current due to the carriers may be coupled out, for example by using a transformer, to provide an output signal which varies at the difference frequency of the incident light beams.

In the simple planar optical mixer the two light beams which are incident on the surface of the mixing layer are at the same angle.

The present invention provides a semiconductor planar optical mixer system comprising a semiconductor planar optical mixer which includes an epitaxially grown mixing layer of semiconductive material on the surface of a substrate of opposite conductivity type, and means for applying to said mixing layer an electrical field to establish therein a drift charge of carriers, means for causing two light beams to be incident on the surface of the mixing layer of said planar optical mixer and to be coplanar with the electric field applied to said mixing layer and means for detecting and extracting the current due to the carriers in said mixing layer which is modulated by said light beams at their difference frequency.

In the semiconductor planar travelling wave mixer the two light beams which are incident on the surface of the mixer are at different angles. Due to the interference effects between the incident light beams, the carrier generation in the surface region of the photo-conductive semiconductor material is associated with the difference frequency of the light beams and results in a travelling wave in the surface region of the mixer having a frequency equal to the frequency difference of the two light beams. The two angles of incidence of the light beam are adjusted until the phase velocity of the difference wave is synchronized with the drift velocity of the charge carriers in the semiconductor. Under this condition the carriers are formed into bunches as they travel along with their generating wave and are representative of the difference frequency of the two light beams. The difference frequency is extracted from the transducer by establishing, in a very limited region, an electric field transverse to the field which establishes the synchronized travelling wave. This transverse field causes a transverse current to flow in accordance with the charge density in the region. Since bunches of charge carriers are entering the region due to the interaction of the two light beams the transverse current varies at the difference frequency and this current can be coupled out as an output signal.

According to one feature of the invention there is provided a semiconductor planar optical mixer system as outlined in the preceding paragraphs wherein means are provided for applying a voltage transverse to said electric field to said mixing layer.

According to another feature of the invention there is provided a semiconductor planar optical mixer system as outlined in the preceding paragraphs wherein means are provided for applying a bias voltage across said mixing layer and said substrate such that a depletion layer exists therebetween.

According to a further feature of the invention there is provided a semiconductor planar optical mixer system as outlined in the preceding paragraphs wherein said mixing layer is provided with a protective layer of transparent material.

The foregoing and other features according to the invention will be understood from the following description with reference to FIGS. 1 to 3 of the drawings which accompanied the Provisional Specification and to FIGS. 4 and 5 of the accompanying drawings.

Figure 1:
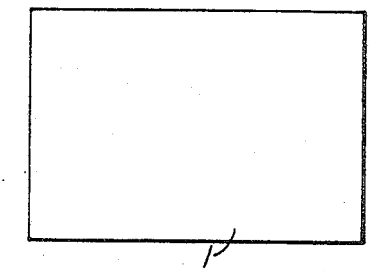
FIG. 1 shows the various stages of manufacture of a simple planar optical mixer.
Figure 1:
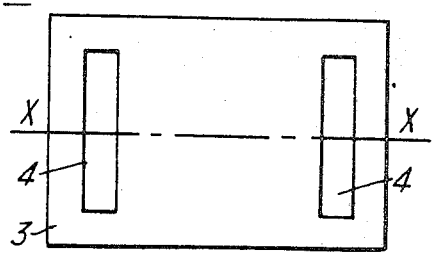
Figure 1:
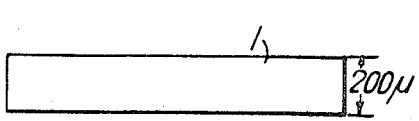
Figure 1:
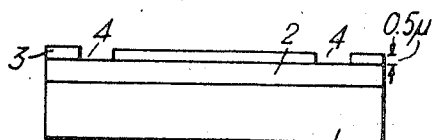
Figure 1:
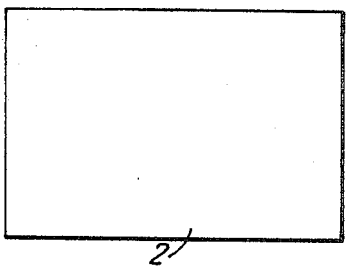
Figure 1:
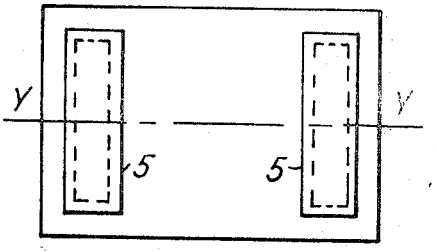
Figure 1:
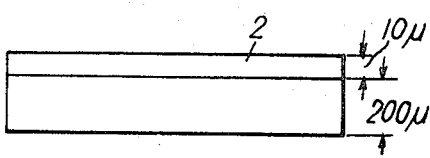
Figure 1:
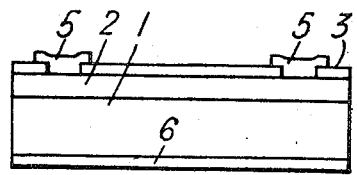

Referring to FIG. 1, various stages of manufacture for a simple planar mixer are shown, diagram A shows a 200μ thick semiconductive substrate 1 which is the starting point for the manufacturing process. Let us assume for purpose of this explanation that substrate 1 is composed of n-type conductivity material. The first stage of this process involves the formation of a 10μ thick layer 2 of semiconductor material, of p conductivity type, on the surface of the semiconductive substrate 1 by epitaxial growth to give the structure shown in diagram B. In the epitaxial process, a solid semiconductor crystal is grown from the vapour phase by deposition on the surface of a semiconductive substrate which is usually cut from a semiconductor crystal grown by conventional means. By using this process it is possible to produce layer upon layer of semiconductor material which can be controlled for thickness and resistivity very accurately. The epitaxially grown layer 2 may be isolated by an appropriate choice of the bias potential applied across the epitaxially grown layer 2 and the semiconductive substrate 1, such that a depletion layer exists between the two conductive regions. A $0.5\mu$ thick layer 3 of silicon oxide, for example silicon monoxide or silicon diode, is now formed over the surface of the layer 2, the windows 4 shown in diagram C are etched away after appropriate masking against etching by, for example, a photolithographic technique, to give the required structure as shown in diagram C. This transparent layer 3 protects the mixing surface from contamination and damage and minimises the effects of surface recombination on the mixing action and by controlling the thickness of the layer 3 it is possible to make it serve as a $\lambda/4$ transformer which reduces the surface reflectivity and enhances the overall quantum efficiency of the mixer. In the final stages of the manufacturing process, the aluminium contacts 5, used for applying the electric field mentioned previously to the epitaxially grown layer 2 to establish therein a drift charge of carriers, are vacuum evaporated and alloyed to the surface of the layer 2, after appropriate masking, and the metallic layer 6 e.g. of aluminium, is vacuum evaporated and alloyed to the surface of the semiconductive substrate 1 to provide the means together with one of the contacts 5 for applying the bias potential mentioned previously across the layer 2 and the substrate 1. The final structure is shown in diagram D.

Figure 4:
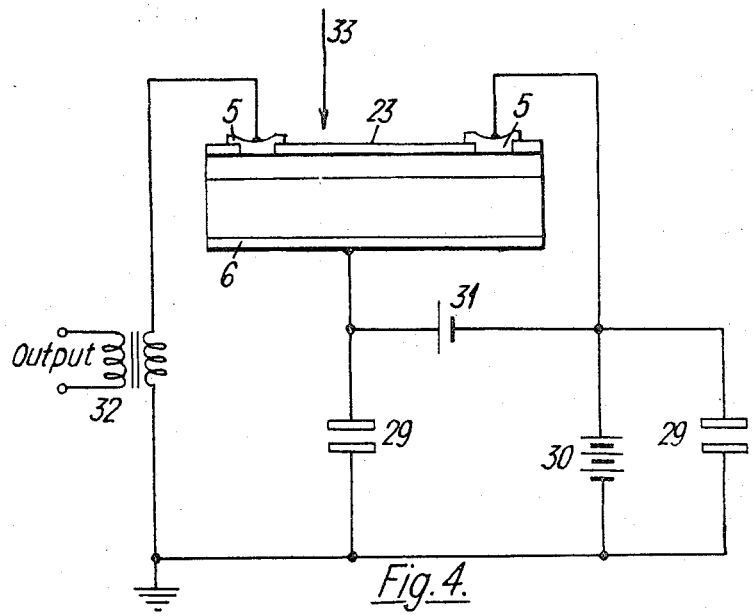
FIG. 4 shows a semiconductor planar optical mixer system which utilises the simple planal optical mixer shown in the drawing according to FIG. 1(D)

FIG. 4 shows a semiconductor planar optical mixer system which utilises the simple planar optical mixer shown in the drawing according to FIG. 1(D). The system comprises the optical mixer 28, bypass capacitance 29, bias battery 30, isolation battery 31, output coupling device 32, and colinear light beams 33.

The bias battery 30 which is used for applying the electric field mentioned previously to the epitaxially grown layer 2 is arranged in the system such that its positive terminal is connected to one of the two contacts 5 whilst its negative terminal is connected to the other of the two contacts 5 via the primary winding of a transformer which forms the output coupling device 32 and to earth potential. The bias battery 30 is shunted by a bypass capacitance 29 and the isolation battery 31 which is optional is connected with its positive terminal to the metallic layer 6 and its negative terminal to the positive terminal of the bias battery 30. The metallic layer 6 is also connected to earth potential via a bypass capacitance 29.

The colinear light beams 33 which are caused by suitable means to be incident on the surface of the optical mixer provide an output signal from the optical mixer as previously stated which is representative of the difference frequency of the colinear light beams 33.

Figure 2:
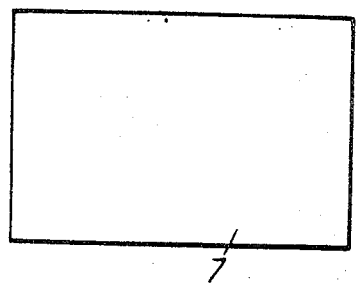
FIG. 2 shows the various stages of manufacture for one form of planar travelling wave optical mixer.
Figure 2:
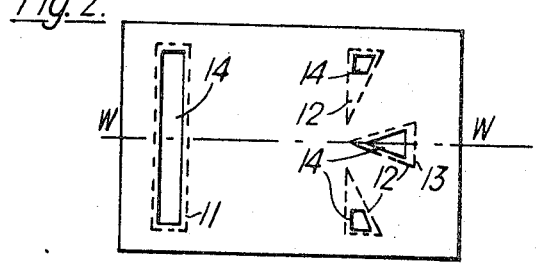
Figure 2:
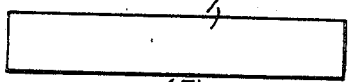
Figure 2:
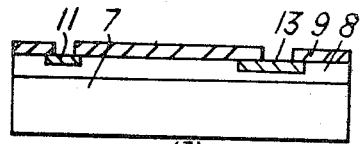
Figure 2:
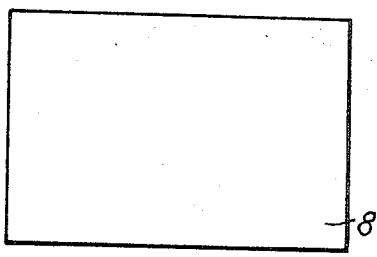
Figure 2:
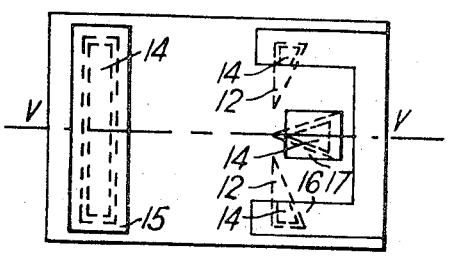
Figure 2:
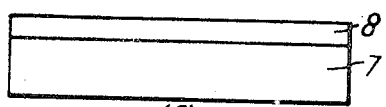
Figure 2:
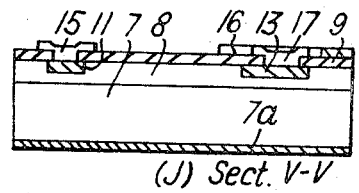
Figure 2:
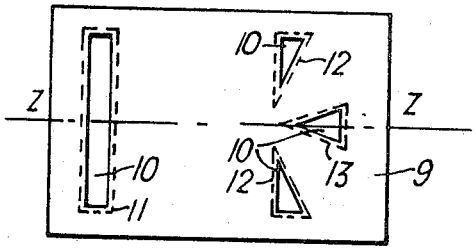
Figure 2:
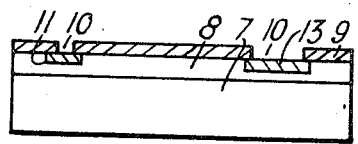

Referring to FIG. 2, various stages of manufacture for a planar travelling wave mixer are shown; diagram F shows a semiconductive substrate 7, for example silicon or germanium, which is the starting point for the manufacturing process. The semiconductor material can be either n or p-type but it is assumed for the purposes of this description that an n-type silicon substrate 7 is used. The first stage of the process involves the formation of a thin mixing layer 8 of p-type semiconductor material on the surface of the substrate 7 by epitaxial growth to give an n-p junction between the epitaxially grown layer 8 and the substrate 7, the layer 8 covers completely the substrate 7 to give the structure shown in diagram G. The epitaxially grown layer 8 may be isolated by an appropriate choice of the bias potential applied across the epitaxially grown layer 8 and the semiconductor substrate 7 such that a depletion layer exists between the two conductive regions. In the next stage, the structure shown in diagram H is obtained by coating the layer 8 with a layer 9 of silicon oxide, for example silicon monoxide or silicon dioxide, by any known method, the windows 10 are then etched through the layer 9 by hydrofluoric acid, the surrounding area being masked against the etching by, for example, a photolithographic technique. A p+ dopant, for example boron is now diffused from its oxide into the surface of the layer 8 to form the layers representative of the drift voltage contact 11, drift electrodes 12 and output electrode 13, said layers terminating under the silicon oxide layer as shown in diagram H. The boron dopant is trivalent and therefore given p-p+ junctions between the diffused layers 11, 12 and 13 and the mixing layer 8. If n-type silicon had been used for the ayer 8 and p-type for the substrate 7 then a phosphorous dopant would have been used for the diffusion process, phosphorous is pentavalent and would therefore have produced the required n-n+ junction. In the case of germanium suitable p donor diffusants are gallium and indium and suitable n donor diffusants are antimony and arsenic. During the diffusion process, silicon oxide grows again, therefore the windows 14 shown in diagram I are etched through the oxide layer 9 by the etching technique previously described to give the structure shown in diagram I. In the final stages of the manufacturing process for this unit, the aluminium contacts 15, 16 and 17, are respectively formed on the surface of the layers 11, 12 and 13 after appropriate masking by vacuum evaporation and alloying the electric field mentioned previously for establishing in the epitaxially grown mixing layer 8 a drift charge of carriers is connected between the contacts 15 and 17 and the transverse sensing current supply is connected between the contact 16 and earth potential. The metallic layer 7a, for example of aluminium, is vacuum evaporated and alloyed to the surface of the semiconductive substrate 1, to provide the means together with the contact 17 for applying the bias potential mentioned previously across the layer 8 and the substrate 7, to give the structure shown in diagram J. The transparent silicon oxide layer performs the same functions as outlined in the preceding paragraph.

Figure 5:
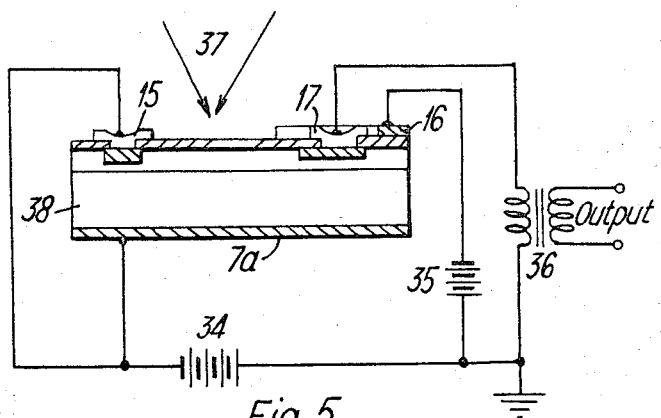
FIG. 5 shows a semiconductor planar optical mixer system which utilises the planar travelling wave optical mixer shown in the drawing according to FIG. 2(J).

A semiconductor planar optical mixer system which utilises the planar travelling wave optical mixer shown in the drawing according to FIG. 2(J) is shown in the drawing according to FIG. 5 and comprises the optical mixer 38, the bias battery 34, the transverse sensing current supply 35, and the output coupling device 36.

The bias battery 34 which is used for supplying the electric field mentioned previously to the epitaxially grown layer 8 is arranged in the system such that its positive terminal is connected to the contact 17 via the primary winding of a transformer which forms the output coupling device 36 and to earth potential whilst its negative terminal is connected to the contact 15 and to the metallic layer 7a. The negative terminal of the transverse sensing current supply 35 which is provided by a battery is connected to the contact 16 whilst its positive terminal is connected to earth potential.

The input light beams 37 which are caused by suitable means to be incident on the surface of the optical mixer at different angles and coplanar with the electric field provide an output signal from the optical mixer as previously stated which is representative of the difference frequency of the light beams 37.

Figure 3:
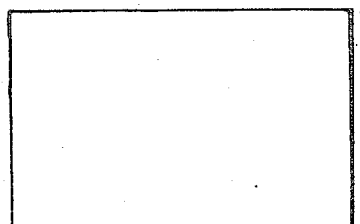
FIG. 3 shows the various stages of manufacture for another form of planar travelling wave optical mixer.
Figure 3:
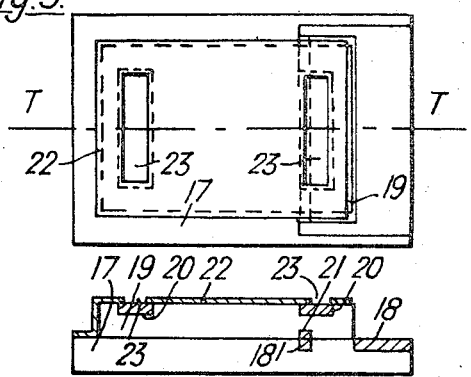
Figure 3:
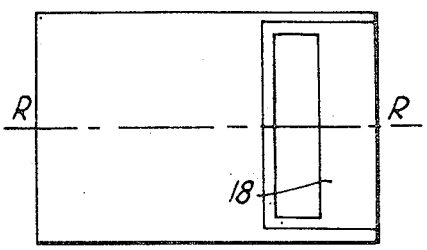
Figure 3:
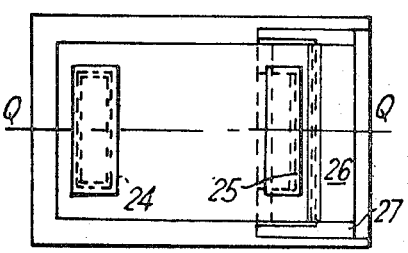
Figure 3:
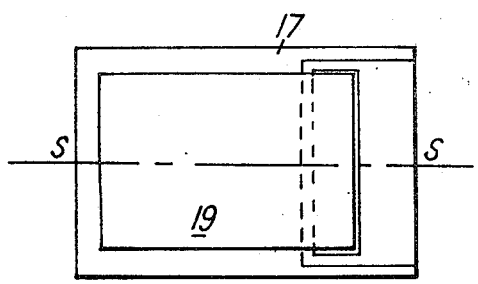

Referring to FIG. 3, various stages of manufacture for another planar travelling wave mixer are shown; diagram K shows a p-type silicon substrate 17 which is the starting point for the manufacturing process. In the first stage of this process the surface of the substrate 17 is suitably masked, for example, by a photolithographic technique, to expose only the regions 18 and 18' shown in diagram L. An n+ dopant, for example phosphorous, is now diffused from its oxide into the surface of the substrate 17 to form the regions 18 and 18' as shown in diagram L thereby giving n–n+ junctions between the regions 18, 18' and the substrate 17. The silicon oxide formed during the diffusion process is etched away using any suitable known method. The next stage involves the formation of a thin layer 19 of n-type silicon over part of the substrate 17 and the region 18', as shown in diagram M, by epitaxial growth thereby giving a p–n junction between the epitaxially grown layer 19 and the substrate 17 and also an n–n+ junction between the region 18' and the layer 19. The epitaxially grown layer 19 may be isolated from the semiconductive substrate 17 by an appropriate choice of the potentials applied across them such that a depletion layer exists between the two conductive regions. In the next stage, the structure shown in diagram N is obtained by coating the layers 17, 18 and 19 with a layer 22 of silicon oxide, for example silicon dioxide or silicon monoxide, by any known method, the windows 23 are then etched through the layer 22 by hydrofluoric acid, the surrounding area being masked against the etching by, for example, a photolithographic technique. An n+ dopant is now diffused into the surface of the layer 19 to form the layers 20 thereby giving n–n+ junctions between the layer 19 and the layers 20. During the diffusion process the region 18' is diffused up into the epitaxially grown layer 19. The silicon oxide formed during the diffusion process and the silicon oxide which covers those parts of the regions 18 and 18' not covered by the layer 19 are etched away after appropriate masking, for example, by a photolithographic technique, to give the structure shown in diagram N. In the final stages of the manufacturing process for this unit, the aluminium layer 27 is formed on the surface of the region 18 and 18', the aluminium contacts 24, 25 and 26, are respectively formed on the surface of the layers 20, 20' and 27 after appropriate masking by vacuum evaporation and alloying. The electric field mentioned previously for establishing in the epitaxially grown mixing layer 19 a drift charge of carriers is connected between the contacts 24 and 25 and the transverse sensing current supply is connected between the contact 26 and earth potential. The metallic layer 17a, for example, of aluminium, is then vacuum evaporated and alloyed to the surface of the semiconductive substrate 17, to provide the means together with the contact 25 for applying the bias potential mentioned previously across the layer 19 and the substrate 17, to give the final structure shown in diagram P. The transparent silicon oxide layer 22 performs the same functions as outlined in previous paragraphs.

The planar travelling wave optical mixer shown in the drawing according to FIG. 3(P) could be used in the system shown in the drawing according to FIG. 5 in place of the planar travelling wave optical mixer 38.

In this arrangement the negative terminal of the bias battery 34 would be connected to the metallic layer 17a and to the contact 24 and the positive terminal would be connected to the contact 25 via the primary winding of the transformed which forms the output coupling device 36. The negative terminal of the transverse sensing current supply 45 would be connected to the contact 26.

The arrangements shown in the drawings according to FIGS. 1 to 3 give convenient, and economical means for mass producing optical mixers; the active surfaces of the mixers are protected; the thin mixing layers have low D.C. power consumption therefore system running costs are reduced and greater A.C. power is possible and the transparent layer assists optical impedance matching.

It is to be understood that the foregoing description of specific examples of this invention is made by way of example only and is not to be considered as a limitation on its scope.

What we claim is:

1. A semiconductor planar optical mixer system comprising a semiconductor planar optical mixer which includes an epitaxially grown mixing layer of semiconductive material on the surface of a substrate of opposite conductivity type, means for applying to said mixing layer an electric field to establish therein a drift charge of carriers parallel to said surface of said mixing layer, means for causing two light beams to be incident at different angles on the surface of said mixing layer of said planar optical mixer, said causing means including further means for adjusting the angles of incidence of the light beams so as to synchronize the drift velocity of said charge of carriers with the difference frequency of said two light beams, a transparent protective layer covering at least the portion of the surface of said mixing layer that is exposed to said light beams, said transparent layer having a thickness corresponding to a quarter wavelength of the incident light so as to enhance the quantum efficiency of said layer, and means for detecting and extracting the current due to the carriers in said mixing layer which is modulated by said light beams at their difference frequency.

2. A semiconductor planar optical mixer system as claimed in claim 1 wherein means are provided for applying a voltage transverse to said electric field to said mixing layer.

3. A semiconductor planar optical mixer system as claimed in claim 1 wherein means are provided for applying a bias voltage across said mixing layer and said semiconductive substrate such that a depletion layer exists therebetween.

4. A semiconductor planar optical mixer system as claimed in claim 1 wherein said means for applying an electric field to said epitaxially grown layer of semiconductor material are provided by vacuum evaporating and alloying electrical contacts to said epitaxially grown layer.

5. A semiconductor planar optical mixer system as claimed in claim 1 wherein said means for applying a bias voltage across said mixing layer and said semiconductive substrate are provided by vacuum evaporating and alloying a metallic layer on the surface of said semiconductive substrate.

6. A semiconductor planar optical mixer system as claimed in claim 1 wherein said means for applying an electric field to said epitaxially grown layer are provided by diffusing a dopant, of the same conductivity type as the epitaxially grown layer, into selected areas of the surface of said epitaxially grown layer and then vacuum evaporating and alloying electrical contacts to said selected diffused areas.

7. A semiconductor planar optical mixer system as claimed in claim 6 wherein said means for applying a voltage transverse to said electric field to said epitaxially grown layer are provided by diffusing a dopant, of the same conductivity type as the epitaxially grown layer, into selected areas of the surface of said epitaxially grown layer and then vacuum evaporating and alloying electrical contacts to said selected diffused areas.

8. A semiconductor planar optical mixer system as claimed in claim 6 wherein said means for applying a voltage transverse to said electric field to said epitaxially grown layer are provided by the formation of a double diffused region, of the same conductivity type as the epitaxially grown layer, between the semiconductive substrate and the epitaxially grown layer, vacuum evaporating a metallic layer to said diffused region and vacuum evaporating and alloying an electrical contact to said metallic layer.

9. A semiconductor planar optical mixer system as claimed in claim 5 wherein said metallic layer is of aluminium.

10. A semiconductor planar optical mixer system as claimed in claim 4 wherein the material used for the electrical contacts is metal.

11. A semiconductor planar optical mixer system as claimed in claim 10 wherein said metal is aluminium.

12. A semiconductor planar optical mixer system as claimed in claim 1 wherein the semiconductor material used for the epitaxially grown layer is selected from a group consisting of silicon and germanium.

13. A semiconductor planar optical mixer system as claimed in claim 1 wherein the protective layer of transparent material is of silicon oxide and has a thickness corresponding to a quarter wave length of the incident light.

14. A semiconductor planar optical mixer system as claimed in claim 13 wherein said silicon oxide is provided by either silicon monoxide or silicon dioxide.

15. A semiconductor planar optical mixer system as claimed in claim 1 wherein said means for detecting and extracting the current due to the carriers in said mixing layer are provided by a transformer.

References Cited

UNITED STATES PATENTS

| 3,435,232 | 3/1969 | Sorenson | 250—211 |
| 3,051,840 | 8/1962 | Davis | 250—211 |
| 3,117,229 | 1/1964 | Friedland | 250—83.3 |

WILLIAM F. LUNDQUIST, Primary Examiner

M. ABRAMSON, Assistant Examiner

U.S. Cl. X.R.

317—235